United States Patent [19]

Seki et al.

[11] Patent Number: 5,619,415
[45] Date of Patent: Apr. 8, 1997

[54] METHOD OF DRAWING A CUTTING AREA

[75] Inventors: Masaki Seki, Tokyo; Satoru Shinozaki, Shimodate; Hideaki Maeda, Oshino-mura, all of Japan

[73] Assignee: Fanuc Ltd., Minamitsuru-gun, Japan

[21] Appl. No.: 341,100

[22] Filed: Nov. 17, 1994

[30] Foreign Application Priority Data

Nov. 19, 1993 [JP] Japan .................................. 5-312878

[51] Int. Cl.⁶ .............................. G06F 19/00; G06G 7/64; G06G 7/66
[52] U.S. Cl. ................... 364/474.22; 364/191; 364/192; 364/474.23
[58] Field of Search .............................. 364/192, 474.21, 364/474.22, 474.24, 474.26, 191

[56] References Cited

U.S. PATENT DOCUMENTS

| 4,530,046 | 7/1985 | Munekata et al. | 364/474.24 |
| 4,723,203 | 2/1988 | Kishi et al. | 364/171 |

Primary Examiner—Roy N. Envall, Jr.
Assistant Examiner—Karen Denise Presley
Attorney, Agent, or Firm—Staas & Halsey

[57] ABSTRACT

In a state where definition of machining has been already finished for the first to N-th processes, such data as a machining kind, tool data including a tool code, and cutting conditions related to the j-th process ($1 \leq j \leq N+1$) are inputted as new data or modified data in an interactive mode on a screen. Next, a shape of the workpiece at a point of time when the (j–1)th machining process has been finished and the final shape of the workpiece to be cut are displayed on a screen, and a cutting area for the j-th machining process is set or modified by means of the screen. Then, a shape of the workpiece at a point of time when the j-th process is finished is found on the basis of the inputted data, and a cutting area to be newly cut or to be modified in the j-th machining process is identified and displayed by displaying one upon the other on the screen the found shape of the workpiece and a shape of the workpiece at a point of time when the (j–1)th process has been finished. The user decides whether the identified and displayed cutting area is adequate or not, and in the case where there is no remaining uncut part or a suitable remaining uncut part, the inputted data is determined and registered as data for machining for the j-th machining process.

6 Claims, 7 Drawing Sheets

METHOD OF DRAWING A CUTTING AREA

BACKGROUND OF THE INVENTION

1. Field of the Invention

The present invention relates to improvement of a method of drawing a cutting area in an automatic programming apparatus or a numerical control apparatus having an automatic programming function.

2. Description of the Related Art

An automatic programming apparatus and a numerical control apparatus having a similar function (hereinafter referred to as an automatic programming apparatus and the like) are already known which allow an operator to set and input a shape of a workpiece to be cut and a shape of a finished part of the workpiece in an interactive mode, to input a kind of machining and data of a tool to be used in machining and cutting conditions for each machining process, and then to set a cutting area in an interactive mode by means of a cutting area setting screen individually displayed for each machining process.

An automatic programming apparatus and the like allow an operator to input data of a workpiece and a finished part through an interactive screen for setting and inputting a shape and dimensions of the workpiece to be cut and an interactive screen for setting and inputting a shape and dimensions of the finished part, to input one by one a machining kind in the order of execution of the machining processes through a process list screen for definition of machining and to input machining data necessary for each machining process through a tool data setting screen, a cutting condition setting screen, a cutting area setting screen, and the like each time a machining kind is inputted, that is, each time a machining process is newly set. And in the case where it is needed to modify some content of a machining process, it is necessary to display a process list screen for modification by newly selecting a program for making a modifying operation and to select a machining process to be modified from the screen and to update the existing data with the newly set and inputted data as new data for the process by repeating the same operations as described above. In such a case as this, however, the process list screen can display only characters and numeric characters, but cannot display a cutting area, a shape of a finished part, and the like.

In an existing automatic programming apparatus and the like also, it has been possible to make a setting operation of a cutting area by specifying a dividing position by means of a cursor and the like on a display screen while referring to a shape of a workpiece and a shape of a finished part on a cutting area setting screen of a display device, but it has been difficult to check a remaining uncut part caused by a shape of a tool and the like since it is impossible to directly see a cutting area itself defined by the cutting area setting operation by means of the display screen of the machining process. The remaining uncut part caused by a shape of a tool and the like is eventually displayed as a shape of the workpiece at a point in time when a cutting area setting screen of the next machining process is displayed, but in the case where an undesirable remaining part left as uncut is found at this point in time, since it is necessary to modify data of the previous machining process after selecting anew a program for making a modifying operation and selecting a process list screen, there is a problem that the machining operation is made troublesome due to such a screen switching operation and the like.

For example, if an operator finds a remaining uncut part produced in the (N−1)th machining process prior to the N-th machining process only at the time when a cutting area setting screen of the N-th machining process is being displayed, the operator has to interrupt or abort a new setting operation of a cutting area for the N-th machining process, erase the cutting area setting screen for the N-th machining process, select a process list screen for modification to carry out a modifying operation, and select the (N−1)th machining process prior to the N-th machining process through a process specifying operation by means of a cursor and the like, and then start the modifying operation.

And there is also a method for detecting a remaining uncut part by utilizing a machining simulation by means of an animation drawing technique, but still it needs a troublesome screen switching operation and needs to start modification of data after selecting anew the machining process for the modifying operation in the same manner as described above in order to modify the data. Moreover, since such a machining simulation method draws moment by moment variation of a machining state while following an actual tool movement, it carries with it a disadvantage of wasting time in the case that an operator wants to check only a remaining uncut part which appears at the end of each machining process.

OBJECTS AND SUMMARY OF THE INVENTION

An object of the invention is to provide a method for drawing a cutting area which makes it possible to solve the above-mentioned disadvantages of the prior art and to check in a short time whether or not there is a remaining uncut part which may appear in each machining process.

DETAILED DESCRIPTION OF THE PREFERRED EMBODIMENTS

Figure 1:
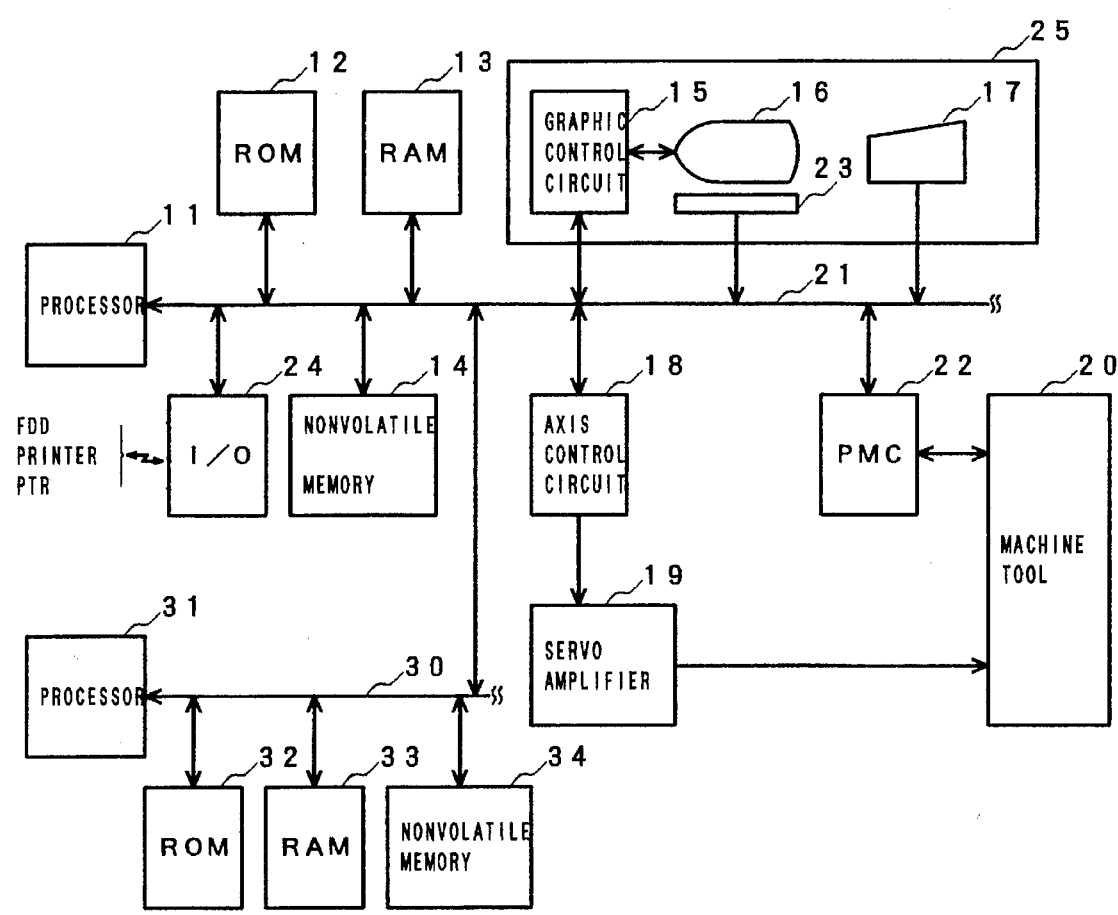
FIG. 1 is a block diagram showing a numerical control apparatus according to an embodiment of the invention.

FIG. 1 is a block diagram showing an example of a numerical control apparatus having an automatic programming function. In this figure, a processor 11 controls the whole numerical control apparatus of an interactive type according to a system program stored in an ROM 12. An EPROM or EEPROM is used as the ROM 12. A RAM 13 has various kinds of data and input/output signals stored in it, and an SRAM or the like is used as the RAM 13. A CMOS backed up by a battery (not shown in any figures) is used as a nonvolatile memory 14 and various kinds of data once stored in it are kept as they are even after the electric power has been interrupted.

A graphic control circuit 15 converts a digital signal into a signal for display and supplies it to a display 16. A CRT or liquid crystal display is used as the display 16. The display 16 displays a shape of a workpiece, machining conditions, and the like when making a machining program in an interactive mode. A keyboard 17 comprises shape element keys, numeric keys, and the like, and necessary graphic data and numerical control data are inputted by using these keys.

An axis control circuit 18 receives a move command of an axis from the processor 11, and outputs the command of the axis to a servo amplifier 19. The servo amplifier 19 receives this move command and drives a servomotor of such a machine tool 20 as a lathe and the like.

The above-mentioned respective components are connected with one another through a bus 21. Moreover, this bus 21 is connected with a programmable machine controller (PMC) 22, software keys 23 each of which is assigned a function specified by a system program or the like, and a serial interface unit 24 which sends numerical control data to such an external device as a floppy disk drive (FDD), a printer, a paper tape reader (PTR), and the like.

In executing a numerical control (NC) program, the PMC 22 receives such a signal as a tool select command (T function signal) and the like, processes this signal by means of a sequence program, and outputs an operation command signal for controlling the machine tool 20. Furthermore, the PMC 22 receives a status signal from the machine tool 20, makes a sequence processing, and transfers an input signal necessary for the processor 11 through the bus 21.

Software keys 23 are provided together with the display 16 and the keyboard 17 on a CRT/MDI panel 25.

In addition to the processor 11, which is a CPU for numerical control, a processor 31 for an interactive operation which has a bus 30 is connected with the above-mentioned bus 21. The bus 30 is connected with an ROM 32, an RAM 33, and a nonvolatile memory 34.

Interactive data input screens to be displayed on the above-mentioned display 16 are stored in the ROM 32. And the display 16 displays operations or data which can be set in the form of a menu on its input screen. Selection of an item from a menu is made by the software keys 23 disposed at the bottom of the screen, corresponding to the menu. Functions assigned to the software keys 23 are changed according to each screen displayed on the display 16. An SRAM or the like is used as the RAM 33, where various kinds of data for interactive operation are stored.

Inputted data are processed by the processor 31 for interactive operation and are integrated into a workpiece machining program. And the workpiece machining program stored in the nonvolatile memory 34 as an NC statement is executed also when a workpiece is machined by the machine tool 20.

FIGS. 4 to 7 are flowcharts showing an outline of a machining data setting process which has been adopted for a numerical control apparatus according to an embodiment of the invention.

The machining data setting process is a process to be performed to store in the RAM 33, as original data, various kinds of information necessary fop making NC data corresponding to operations related to setting and inputting of a shape and dimensions of a workpiece and those of a finished part of the workpiece to be cut and corresponding to specification of the order of performing the respective machining processes on the basis of inputted kinds of machining processes and corresponding to operations conducted by an operator while referring to a tool data setting screen, a cutting condition setting screen, and a cutting area setting screen which are displayed for each input of a kind of machining. The original data stored in the RAM 33 through the machining data setting process eventually undergo an automatic programming process performed by the processor 31, are converted into NC data, and are stored in the nonvolatile memory 34. However, since these processes are the same as those of an existing apparatus, description of them is omitted and a machining data setting process directly related to a method of the present invention, particularly, related to a part of the process different from those of an existing apparatus is described in detail in the following.

First, an operator defines an initial shape and initial dimensions of a workpiece by selecting a menu titled "Initial workpiece" from the initial menu displayed on the display 16 by means of a software key, making the processor 31 activate a system program corresponding to it, and making an input operation of various data in a way similar to that of the prior art while referring to an interactive screen displayed on the display 16 (step S1), and stores a graphic defined by the initial shape and initial dimensions in a shape storing file F0 of the RAM 33 (step S2). The initial workpiece (a "blank") is a workpiece to be machined, that is, a workpiece in a state prior to the first machining process and after finishing this defining operation, the operator defines a shape and dimensions of a finished part (a part to be cut, i.e., an end product which an operator wishes to obtain by machining) to be targeted as a final product in the same way as described above by selecting a menu titled "Part shape" and activating a system program corresponding to it (step S3), and stores the defined data in a shape storing file F' of the RAM 33 (step S4).

Figure 2:
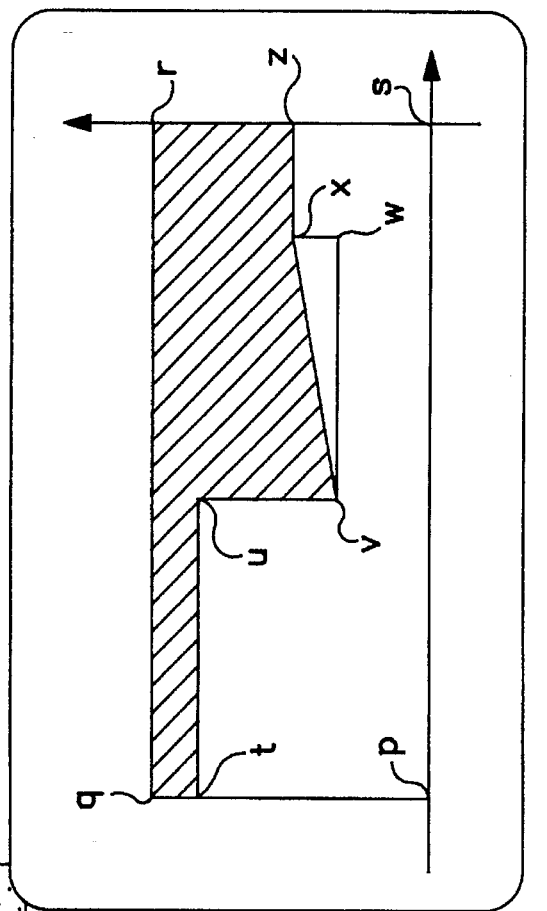
FIG. 2 is a figure showing a process list screen of a display of the numerical control apparatus according to the embodiment of the invention.

The processor 31, having confirmed registration of the initial workpiece shape workpiece to be machined and the part shape as the finished product (part to be cut), switches over the screen of the display 16 to a screen for "Definition of machining" as shown in FIG. 2 (step S5), and displays names of selectable machining kinds in a machining kind list displaying area b on this screen (step S6). In addition to the kinds of machining processes listed in the machining kind list displaying area b in FIG. 2, other kinds of machining selectable are an outer diameter intermediate finishing process, an inner diameter intermediate finishing process, an outer diameter finishing process, an inner diameter finishing process, a grooving or chamfering process, a thread chasing process, and the like.

Next, the processor 31 decides whether or not the current value of a number-of-processes storing register i is zero (step S7). In the case where a result of the decision in step S7 is False (N) since i ($i \geq 1$) processes have been already registered into the RAM 33, the processor 31 displays names of machining kinds of the processes 1 to i and codes of tools selected for use in the respective machining processes in a process list displaying area a (step S8). And the processor 31 increments the value of the register i by 1 and stores the resulting value in the current process storing register j (step S9).

On the other hand, in the case where no machining processes have been registered in the RAM 33 (i=0), a result of the decision in step S7 is True (Y). And the processor 31 displays nothing in the process list displaying area a, immediately goes to step S9, and stores a value obtained by adding 1 to the value of the register i (=0), that is, 1, in the current process storing register j.

And the processor 31 puts the cursor at a position of a process j in the process list on the screen (step S10). An example of FIG. 2 shows a state where the cursor csl is positioned at "Process 07" (j=7). Operations related to definition of machining have been already finished for processes prior to the process 7, that is, for processes 1 to 6 as shown in FIG. 2.

Next, the processor 31 comes to be in the wait state of waiting for either an operation of the abort key (step S11) for terminating the processing related to definition of machining, an operation of the cursor forward key or the cursor backspace key (step S12 or S13) for moving the cursor csl which is positioned at the process (i+1) to a position of either of processes 1 to i, and an operation of the ten-key pad (step S14) for specifying a machining kind for the machining process j at which the cursor csl is positioned.

Here, in case of attempting to modify a machining kind or the like with regard to a machining process for which definition of machining was previously made (for example, process 04 in FIG. 2), the operator presses the cursor backspace key three times. Thereupon, the processor 31 decrements a value of the current process storing register j by 1 each time the backspace key is pressed (step S15). As a result, after confirming that the value of the current process storing register j does not become zero (step S16), in an area c of FIG. 2, as described later in detail, the processor 31 draws a shape of a finished part to be cut as a final product and a shape of the workpiece at the beginning of machining in a process j corresponding to the value of the current process storing register j (that is, a shape of the workpiece at a point of time when machining in the process (j−1) has been finished) (step S20), and then displays the cursor csl at the position of the process j (step S10).

On the other hand, in order to return the cursor from process 04 to process 05, it will do to press once the cursor forward key. Thereupon, in response to this key operation, the processor 31 increments the value of the current process register j by 1 (step S18). As a result, after confirming that the value of the current process storing register j does not exceed 07 (step S19), in an area c of FIG. 2, in the same manner as described above, the processor 31 draws the shape of the finished part (part to be cut, designated by section p-t-u-v-w-x-z-s-p) and a shape of the workpiece at the beginning of machining (workpice to be machined, designated by section p-q-r-s-p) in a process j (=05) corresponding to such updated value of the current process storing register j (that is, a shape of the workpiece at a point of time when process 04 has been finished) and a shape of the workpiece at a point of time when the process j is finished (step S20), and then displays the cursor csl at the position of the process j (step S10).

In the case where a cursor forward or cursor backspace operation by the operator means to move the cursor csl outside a range of processes displayed on the current screen (in an example of FIG. 2, to process 0 or to process 8), according to decision in step S16 or S19, the processor 31 positions the cursor csl at a process currently displayed at the top (process 01) or at the bottom (process 07).

When the operator attempts to set a new machining kind for the (i+1)th machining process or attempts to modify a machining kind for any one of machining processes among the first to i-th machining processes, the operator, positioning the cursor csl at a position of the targeted process, selects a numerical value corresponding to the machining kind to be newly set or to be set as modification from the list in the area b in FIG. 2 and then types the numerical value. For example, when attempting to newly set a drilling process at process 07 where the cursor is currently positioned, the operator, positioning the cursor csl at the position of the process 07, inputs "2" of the ten-key pad of the keyboard 17. Thereupon, the processor 31 stores a machining kind corresponding to the typed numerical value as a machining kind of the machining process j in the RAM 33 (step S22).

Next, the processor 31 reads a shape of the workpiece at a point of time when the (j−1)th machining process prior to the current process j has been finished, which is registered in a shape storing file Fj-1 of the RAM 33, that is, a shape of the workpiece at the beginning of machining in the process j, into a temporary shape storing file F" (step S23).

Then, the processor 31 switches over the screen of the display 16 from a screen displaying a process list in the area a on it as shown in FIG. 2 to a screen for setting tool data corresponding to a machining kind (step S24). Then the operator sets various tool data (for example, a tool code, a compensation value of a tool position, and the like) in a conventional manner while referring to this screen, and stores those set data as tool data of the machining process j in the RAM 33 (step S25).

Furthermore, the operator switches the screen of the display 16 to a cutting condition setting screen corresponding to the machining kind and the tool (step S26), and the operator, referring to this screen, sets various cutting conditions (for example, a return relief length, a finishing allowance, and the like) in a conventional manner, and stores those set data as cutting conditions of the machining process j in the RAM 33 (step S27).

Next, the processor 31 switches over the screen of the display 16 to a cutting area setting screen corresponding to the machining kind and the tool (step S28), and draws on this screen a graphic stored in the temporary shape storing file F", that is, a shape of the workpiece at the beginning of machining in the process j and the shape of the finished part to be targeted as the final product which is stored in the temporary shape storing file F'. And furthermore, the processor 31 displays an operator's operation necessary for setting a cutting area in the machining process j on the screen in an interactive mode (step S29).

Figure 3:
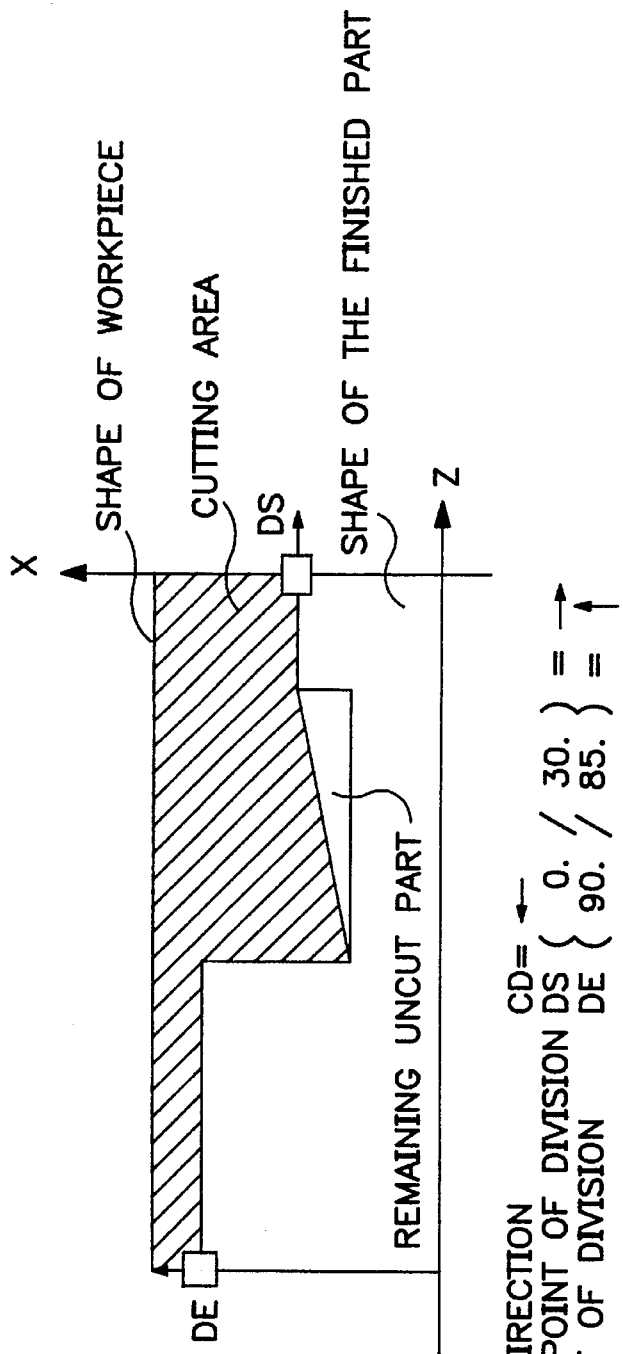
FIG. 3 is a figure showing a cutting area setting screen of the display of the numerical control apparatus according to the embodiment of the invention.
Figure 4:
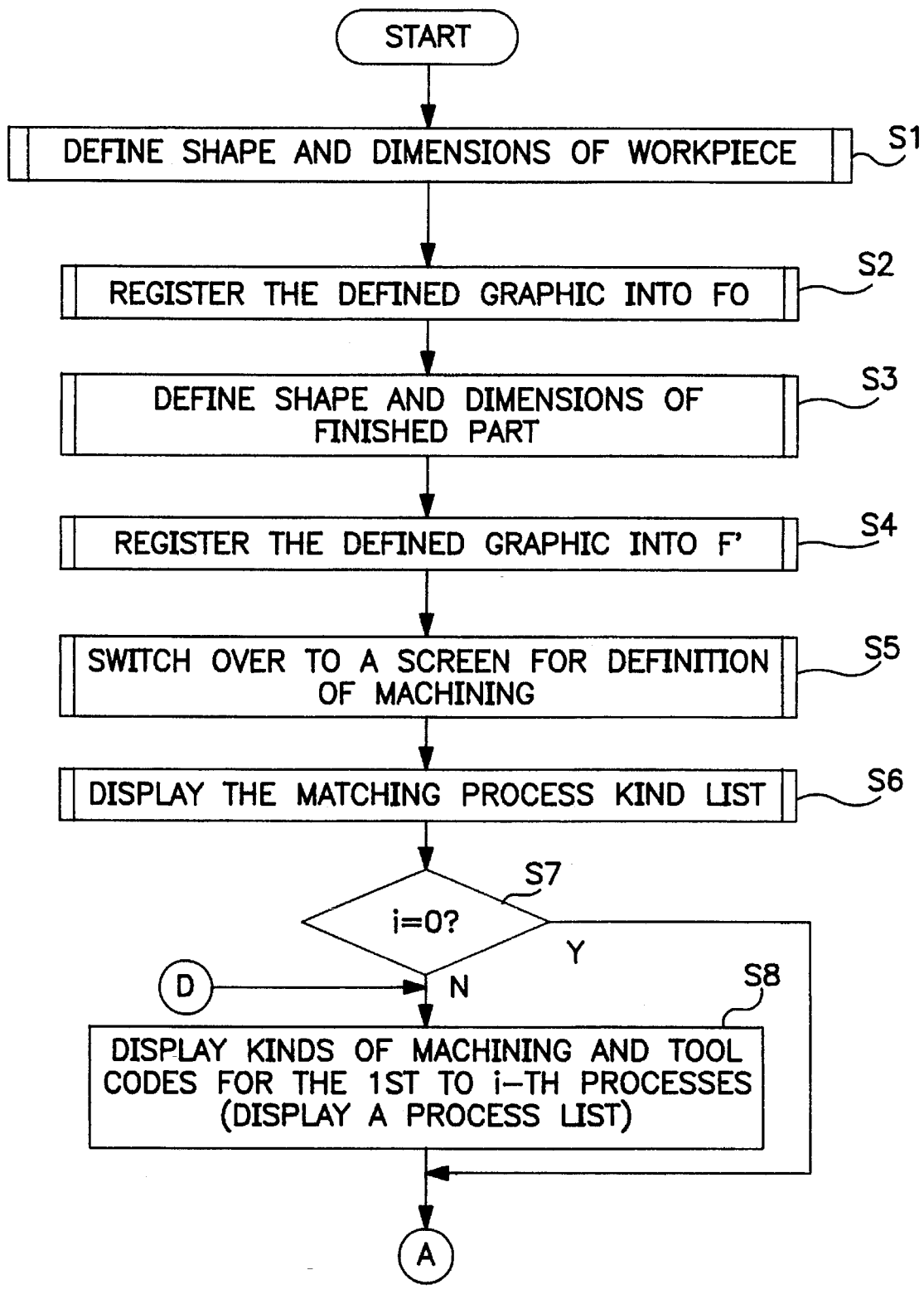
FIG. 4 is a part of a flowchart showing an outline of a machining data setting process by means of the numerical control apparatus according to the embodiment of the invention.
Figure 5:
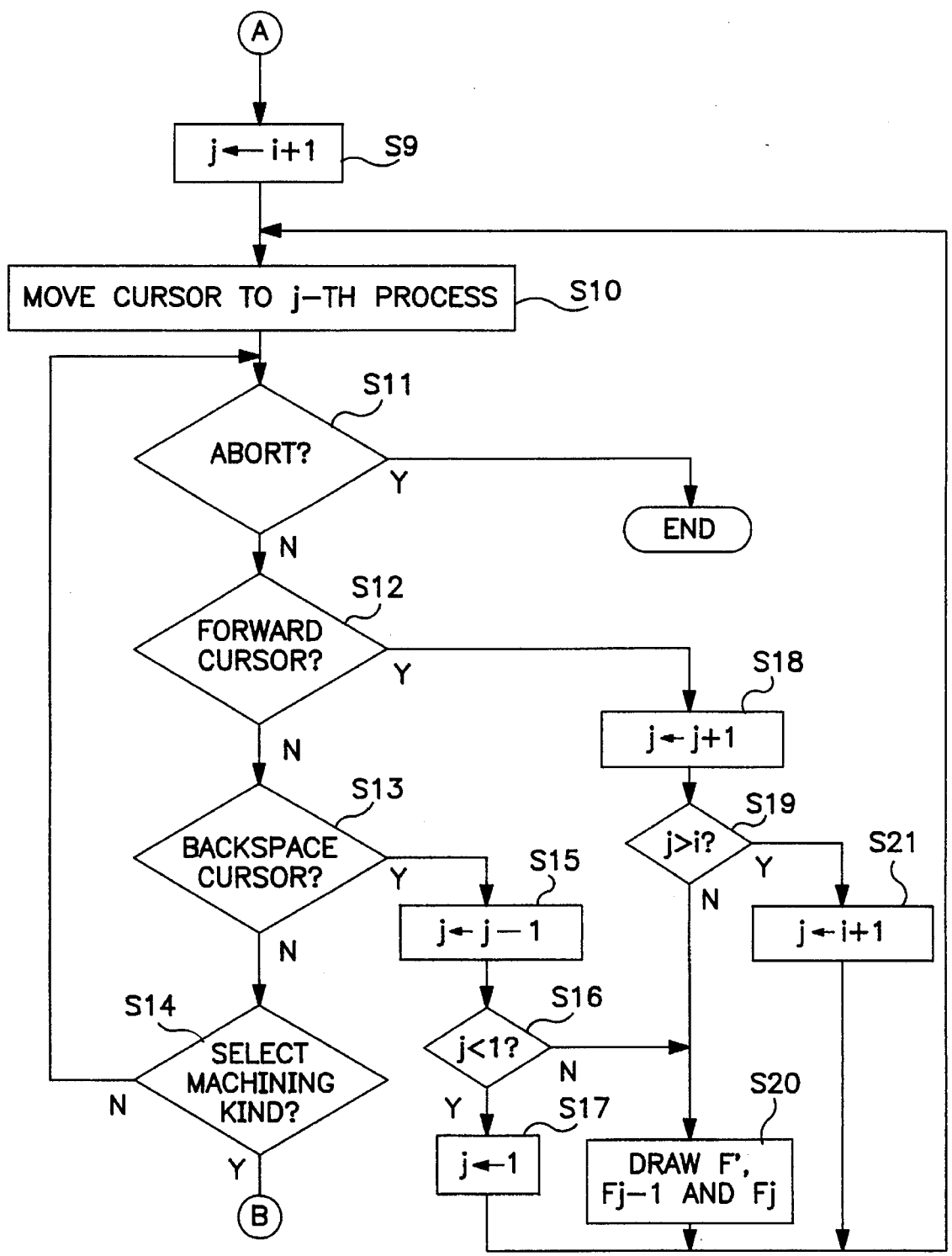
FIG. 5 is a flowchart continued from FIG. 4.
Figure 6:
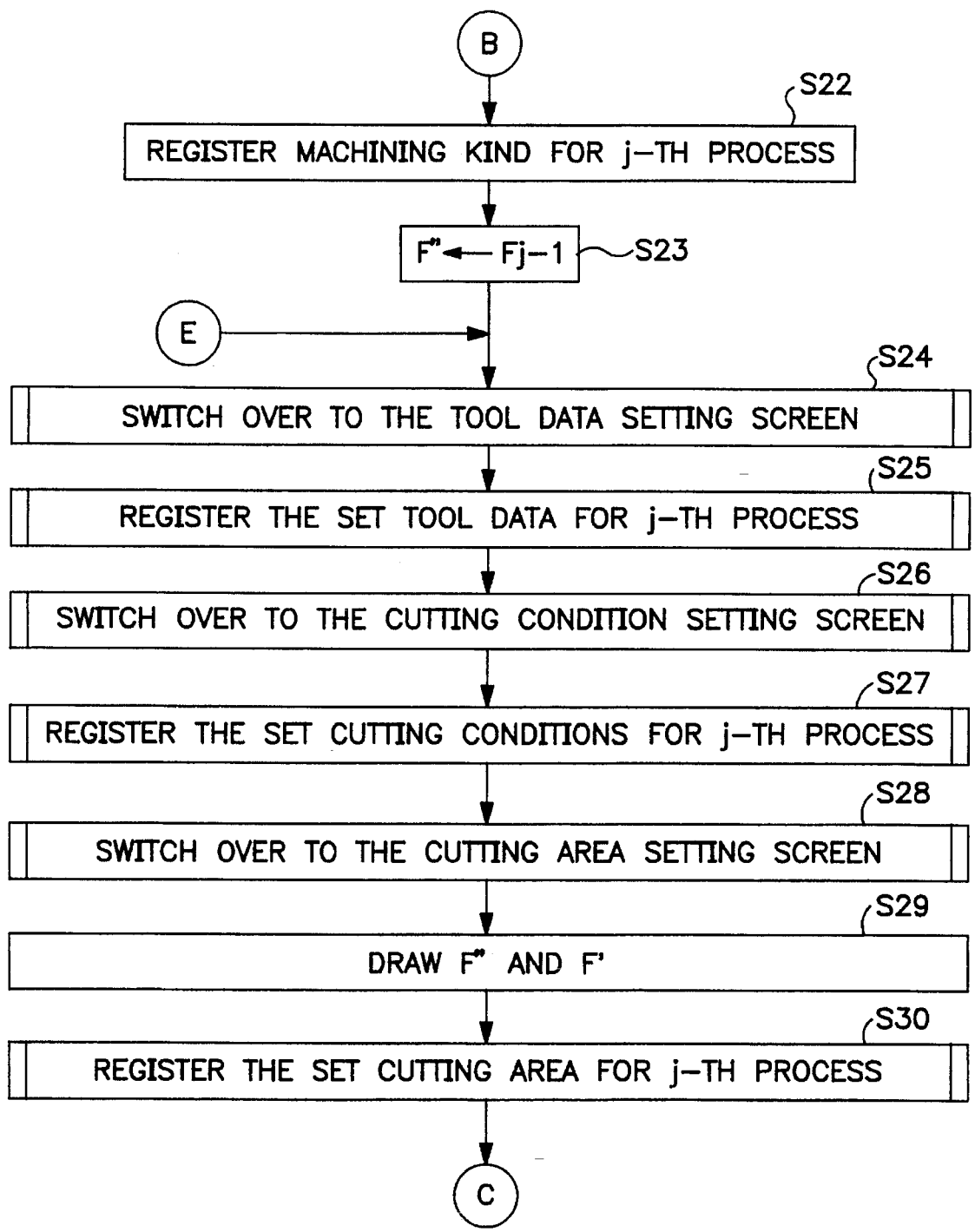
FIG. 6 is a flowchart continued from FIG. 5.
Figure 7:
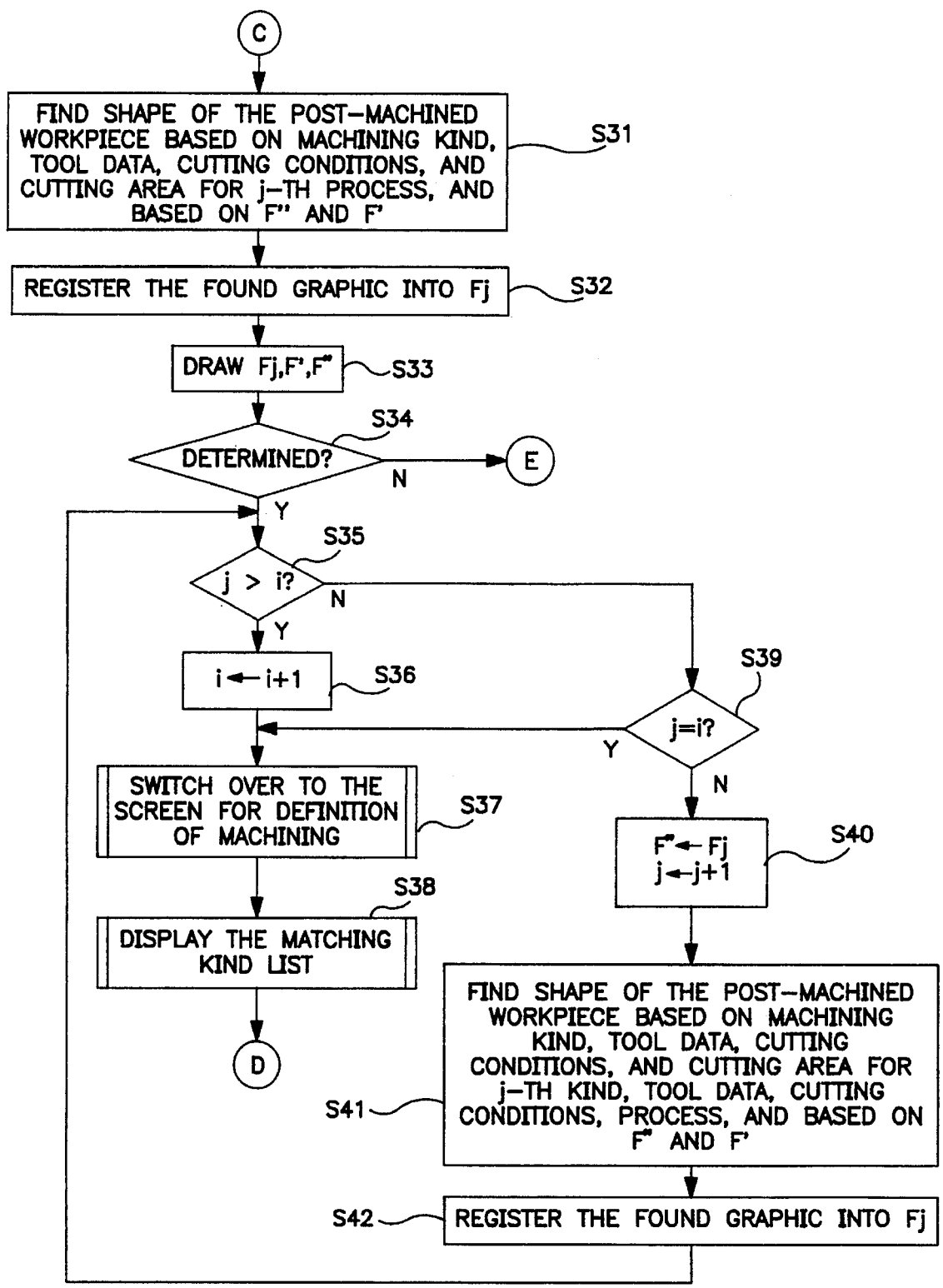
FIG. 7 is a flowchart continued from FIG. 6.

Then, the operator sets a cutting area in an interactive mode by means of the above-mentioned screen. The operation in this case is similar to a method of the prior art. That is, as shown in FIG. 3, the operator makes an area division by setting the starting point cursor DS and the end point cursor DE by means of the cursor moving key, and further inputs an arrow showing a cutting direction for each cursor position through the keyboard 17. In this manner, the operator specifies an area surrounded by a shape of the workpiece at the beginning of the machining process, the shape of the finished part to be targeted, and extended lines of the respective arrows as the cutting area.

Thus, when a setting operation of a cutting area by an operator has been finished, the processor 31 stores the cutting area set by the operator as a cutting area for the machining process j in the RAM 33 (step S30).

When input of the various data is finished in the above-mentioned manner, the processor 31 obtains a shape of the workpiece at a point in time when the machining process j is finished, on the basis of the machining kind, the tool data, the cutting conditions, the cutting area for the process j, the workpiece shape file F" at the beginning of the machining process, and the finished part shape file F' (step S31), and then stores thus obtained shape of the workpiece in the shape storing file Fj (step S32).

The processor 31 draws on the screen of the display 16 the thus obtained shape of the workpiece at a point of time when the machining process j is finished, together with the shape of the workpiece before starting the machining process j (the workpiece shape F" at the beginning of the process, which was stored in step S21) and the shape of the finished part initially stored in the shape storing file F'. Additionally, the processor 31 displays on the same screen the cutting area to be actually cut in the machining process j designated by section t-q-r-z-x-v-u-t in FIG. 2 (a cutting area surrounded by the workpiece shape F" at the beginning of the machining process j and the workpiece shape Fj at a point of time when the process j is finished), for example, as a hatched area as shown in FIG. 3 (step S33). The above-mentioned drawing process in step S20 is equivalent to the process in step S33.

Here, the cutting area to be actually cut in the machining process j is explained using FIG. 3. FIG. 3 shows an example of a result of a machining process where a workpiece, which was cylindrical at the beginning of the process j, is formed by turning a greater diameter portion and a smaller diameter portion and further cut between these portions a peripheral groove by means of an offset tool or the like whose lip width is greater than the width of a peripheral groove of the workpiece. A machining process by means of such a tool cannot make a peripheral groove having sharp corners in both sides due to a problem related to its lip width and lip angle and so leaves a remaining uncut part of the workpiece at its right corner part. And it is a shape of the workpiece containing the remaining uncut part that is stored in the above-mentioned shape storing file Fj.

That is to say, a shape which is stored in the shape storing file Fj and, as a result, is displayed on the screen as a shape of the workpiece at a point of time when the said process j is finished (designated by section p-t-u-v-x-z-s-p in FIG. 2), on the basis of the data stored in the shape storing file Fj, is influenced by its machining kind, tool data, and cutting conditions, but is not an area determined on the basis of only input of the starting point cursor, the end point cursor, and an arrow showing its cutting direction.

Then, the operator checks the cutting area to be actually cut, which is displayed on the screen of FIG. 3 and judges whether or not the cutting area has a remaining uncut part and whether the uncut part (designated by section v-x-w-v in FIG. 2) is allowable or not, and the like, and if there is no problem, the operator operates a software key for the determination. And in the case where an undesirable remaining uncut part has been found, the operator returns to the tool data setting screen by operating a software key for a retry operation, repeats the same operations as the above-mentioned through modifying a tool to be used, cutting conditions, or the like (step S24 to S34), and solves such an undesirable problem as a remaining uncut part and the like. Since the operator can check then and there a remaining uncut part or the like which appears in the current machining process by means of the cutting area setting screen used in setting the cutting area, it is easy to find a mistake in setting in relation to tools or cutting conditions and, moreover, it is possible to immediately return to the tool data setting screen for the machining process and start its modifying operation.

When the operator, having finished the retry operation, operates a software key for a determining operation, the processor 31 detects this operation through a decision process in step S34 and decides whether or not a value of the current process storing register j is greater than the current value of the number-of-processes storing register i, that is, whether the machining process defined in the above-mentioned processes in steps S22 to S33 is a machining process which has been registered for the first time as a new machining process or is a machining process obtained by adding a modifying operation to a previously defined machining process (step S35).

In the case where a value of the register j is greater than the current value of the register i and the machining process defined at this time is a newly registered process, the processor 31 increments the number-of-processes storing register i by 1 and stores the addition of a new machining process (step S36), and returns the screen of the display 16 to the process list screen of FIG. 2, performing the same processes as steps S5 and S6 (steps S37 and S38). Then, the processor 31 performs again the processes of steps S8 to S10, and then comes to be in the wait state waiting for starting definition of machining for a new machining process or for starting a modifying operation (steps S11 to S14). At this time, since the processes of steps S8 to S10 are performed on the basis of the updated value of the number-of-processes storing register i, a process number, a machining kind, and a tool to be used for the latest machining process newly defined at this time are displayed in addition to the last item in the process list displaying area a, and furthermore, the cursor comes to be automatically displayed at the position of the next process number.

On the other hand, in the case where a result of decision in step S35 is False, that is, in the case where the machining process defined at this time is a machining process obtained by giving a modifying operation to a previously defined machining process, a shape or the like of the workpiece in a machining process on and after the (j+1)th process may be changed due to this modifying operation. Therefore, until the current value of the current process storing register j reaches the final value i of the number of processes which have already been registered (step S39), the processor 31 modifies the shape data which have already been registered for the (j+1)th to i-th processes by performing one: after another the process of step S40 corresponding to the above-mentioned process of step S23, the process of step S41 corresponding to the above-mentioned process of step S31, and the process of step S42 corresponding to the above-mentioned process of step S32 for each of the (j+1)th to i-th machining processes as using the value j of the machining process to which a modifying operation has been added by the above-mentioned operation as the initial value. Such various data as machining kinds, tool data, and cutting conditions used in these processes have been already registered into the RAM 33, corresponding to the respective processes.

In the case where a result of the decision in step S39 is True and therefore it is confirmed that all shape data registered for the (j+1)th to i-th processes have been modified, the processor 31 returns the screen of the display 16 to the process list screen of FIG. 2 in the same manner as described above (steps S37 and S38), and then performs again the processes of steps S8 to S10 and comes to be in the wait state waiting for starting definition of a new machining process or for starting a modifying operation (steps S11 to S14). In the case where a modifying operation has been performed in relation to a machining process, the number of processes itself is not changed so that the value of the number-of-processes storing register i is not updated.

As described above, since, according to a cutting area drawing method of the present invention, it is possible to directly and visually check a cutting area set for the current machining process by means of the cutting area setting screen being currently in use without switching over this cutting area setting screen to the next screen, it is possible to easily check in a short time whether or not there is a remaining uncut part and to reduce the number of mistakes in setting data in relation to tools and cutting conditions. Furthermore, since it is possible to easily check a part shape and a cutting area defined for a machining process on the process list screen by only selecting the previously set machining process from the process list screen, it is possible to easily find a machining process in which an undesirable remaining uncut part has been produced, thus enabling for an operator to start modification operation on the spot.

What is claimed is:

1. A method of drawing a cutting area of a workpiece to be machined, wherein an initial shape of the workpiece and a shape of a part of the workpiece to be cut, which when cut results in a finished part, are set and inputted in an interactive mode in one of an automatic programming apparatus and a numerical control apparatus; a kind of machining, data of a tool to be used in the machining, and a cutting condition are specified and inputted for each machining process in said apparatus; and a cutting area setting screen for each machining process is respectively displayed on a display to enable setting of the cutting area for each machining process in an interactive mode, said method comprising the steps of:

drawing, on the cutting area setting screen for each machining process, the shape of the part of the workpiece to be cut to achieve the finished part, and the shape of the workpiece which has been defined in the machining process just before said each machining process, and drawing, on the cutting area setting screen, the cutting area defined in said each machining process, after completing setting of the cutting area for said each machining process, wherein the shape of the part of the workpiece to be cut to achieve the finished part and the cutting area defined in said each machining process are simultaneously displayed to reveal a remaining uncut part of the workpiece which would still need to be cut after completion of said each machining process.

2. A method of drawing a cutting area of a workpiece to be machined, wherein an initial shape of the workpiece and a shape of a part of the workpiece to be cut, which when cut results in a finished part, are set and inputted in an interactive mode in one of an automatic programming apparatus and a numerical control apparatus; a kind of machining, data of a tool to be used in the machining, and a cutting condition are specified and inputted for each machining process in said apparatus; and a cutting area setting screen for each machining process is respectively displayed on the display to enable setting of the cutting area for said each machining process in an interactive mode, said method comprising the steps of:

providing a process list screen for displaying kinds of machining in a list on the display screen in accordance with the order of the performing of the respective machining processes; and displaying the shape of the part of the workpiece to be cut to achieve the finished part, and the cutting area defined in said each machining process, in response to said each machining process being selected from said process list screen, at a same time on a screen, to reveal a remaining uncut part of the workpiece which would still need to be cut after completion of said each machining process.

3. A method of drawing a cutting area of a workpiece to be machined, comprising the steps of:

(a) making a definition of machining for each of machining processes one after another from the first machining process to find a shape of the workpiece at a point in time when said each machining process is finished and storing the found shape of the workpiece in a memory;

(b) displaying on a screen a process list showing a kind of machining and a code of a tool to be used in the machining for each machining process with regard to the first to N-th (N is an integer at least as great as 1) processes for which definition of machining has been already finished respectively and has been already stored in the memory in said step (a);

(c) inputting, for the (N+1)th machining process, a new kind of the machining, tool data including an associated tool code, and necessary machining data including cutting conditions in an interactive mode on the screen and storing the inputted machining data in the memory;

(d) setting a cutting area for the (N+1)th machining process in an interactive mode by means of the screen after drawing a shape of a finished part of the workpiece as a final product and a shape of the workpiece at a point in time when the N-th machining process has been finished;

(e) storing the inputted cutting area as a cutting area for the (N+1)th machining process;

(f) obtaining a shape of the workpiece at a point in time when the (N+1)th machining process is finished on the basis of the above-mentioned machining data inputted for the (N+1)th machining process in said step (c), the cutting area set in said step (d), the shape of the workpiece at a point in time when the N-th machining process has been finished which is stored in said step (a), and the shape of the finished part of the workpiece as the final product which has been already stored, and storing the found shape of the workpiece;

(g) identifying and displaying an area to be actually cut in the workpiece in the (N+1)th process by displaying the shape of the workpiece at a point in time when the N-th machining process has been finished and the shape of the workpiece at a point in time when the (N+1)th machining process is finished, one upon the other at the same time on the same screen; and (h) deciding whether the cutting area identified and not displayed on the screen in said step (g) is adequate, and then one of determining the shape of the workpiece obtained in said step (d) as the shape of the workpiece at a point in time when the (N+1)th machining process is finished in the case where the cutting area is adequate, and repeating the operations of said steps (f) to (h) until the cutting area becomes adequate in the case where the cutting area is inadequate.

4. A method of drawing a cutting area of a workpiece to be machined, comprising the steps of:

(a) making a definition of machining for each of machining processes one after another from the first machining process to find a shape of a workpiece at a point in time when said each machining process has been finished and storing the found shape of the workpiece in a memory;

(b) displaying on a screen a process list showing a kind of machining and a code of a tool to be used in the machining for each machining process with regard to the first to N-th (N is an integer at least as great as 1) processes for which definition of machining has been already finished respectively and has been already stored in the memory in said step (a);

(c) specifying the i-th machining process ($1 \leq i \leq N$) whose machining has already been defined but is to be modified, from said process list on the screen in said step (b), (d) displaying on the screen the shape of the workpiece at a point in time when the i-th process is finished and the shape of the workpiece at a point in time when the (i−1)th process has been finished which have been stored in said step (a) one upon the other;

(e) specifying, by means of the screen in said step (a), items to be modified among the kind of the machining, the tool to be used, the cutting conditions, the cutting area, which have been already defined for the i-th machining process, inputting data necessary for modifying the definition of machining in the specified items, and replacing the unmodified data with the data inputted for modification in the memory;

(f) obtaining a shape of the workpiece at a point in time when the modified i-th machining process is finished, on the basis of the definition of machining which has been modified in said step (e);

(g) identifying and displaying an area to be actually cut in the workpiece in the modified i-th process by displaying on the same screen the shape of the workpiece at a point in time when the i-th machining process is finished which has been obtained in said step (f) and the shape of the workpiece at a point in time when the (i−1)th machining process has been finished which has been stored in said step (a), one upon the other;

(h) deciding whether the cutting area identified and displayed on the screen in said step (g) is adequate, and one of determining the shape of the workpiece obtained in said step (f) as a shape of the workpiece at a point of time when the i-th machining process is finished in the case where the cutting area is adequate and repeating the operations of said steps (f) to (h) until the cutting area becomes adequate in the case where the cutting area is inadequate; and (i) making a modification of the definition of machining for the (i+1)th to N-th processes, as a result of the modification of definition of machining for the i-th machining process, by repeating operations equivalent to the operations in said steps (c) to (h), one after the other with regard to each of the (i+1)th to final N-th processes, when the modified shape of the workpiece at a point in time when the i-th machining process is finished has been determined.

5. A method a drawing machining conditions of a workpiece to be machined, wherein an initial shape of the workpiece and a shape of the portion of the workpiece to be cut to produce a finished part of the workpiece are input to one of an automatic programming apparatus and a numerical control apparatus, a kind of machining, a kind of machining, data of a tool to effect the kind of machining and cutting condition are specified for each machining process performed, said method comprising the steps of:

setting a cutting area for each machining process;

displaying for each machining process, on a cutting area setting screen, the shape of the portion of the workpiece to be cut to produce the finished part and the cutting area for said each machining process simultaneously, the difference between the shape of the portion of the workpiece to be cut and the cutting area being a remaining uncut area which needs to be machined to produce the finished part.

6. The method as claimed in claim 5, further comprising the step of displaying for said each machining process, a shape of the workpiece after completion of a prior machining process immediately preceding said each machining process simultaneously with the displaying of the shape of the portion of the workpiece to be cut to produce the finished part and the cutting area for said each machining process.

* * * * *

UNITED STATES PATENT AND TRADEMARK OFFICE
CERTIFICATE OF CORRECTION

PATENT NO. : 5,619,415
DATED : April 8, 1997
INVENTOR(S) : Masaki SEKI, et al.

It is certified that error appears in the above-indentified patent and that said Letters Patent is hereby corrected as shown below:

Col. 2, line 15, change "needs" to --requires--
        line 62, change "an" to --a--
Col. 8, line 36, delete ":"
Col. 9, line 9, delete "for"
        line 10, after "start" insert --a--.

Signed and Sealed this

Ninth Day of September, 1997

Attest:

BRUCE LEHMAN

*Attesting Officer*      *Commissioner of Patents and Trademarks*